1. United States Patent
Titt

[15] 3,696,691
[45] Oct. 10, 1972

[54] TWO-STAGE WORM GEAR TRANSMISSION
[72] Inventor: Georg Titt, Obere Vorstadt 9, D-8358 Vilshofen, Germany
[22] Filed: Dec. 21, 1970
[21] Appl. No.: 100,316

[52] U.S. Cl. .................................. 74/797, 74/750 R
[51] Int. Cl. .......................... F16h 1/28, F16h 3/44
[58] Field of Search ........................... 74/797, 750 R

[56] References Cited

UNITED STATES PATENTS

| | | | |
|---|---|---|---|
| 781,944 | 2/1905 | Hall | 74/797 |
| 1,276,855 | 8/1918 | Apple | 74/797 |
| 1,904,319 | 4/1933 | Marolf | 74/750 R |
| 2,209,367 | 7/1940 | Watson | 74/750 R X |
| 2,349,642 | 5/1944 | Watson | 74/797 X |

Primary Examiner—Arthur T. McKeon
Attorney—Steinberg & Blake

[57] ABSTRACT

A two-stage worm gear transmission in which a first-stage worm gear drive has a worm wheel operatively connected with a worm of a second-stage worm gear drive to drive the latter worm. The second-stage worm gear drive includes a stationary worm wheel having an inner periphery provided with teeth which mesh with the worm of the second-stage drive. Both the first-stage worm gear drive and the worm of the second-stage worm gear drive are carried by a rotary frame which has an axis coinciding with the axis of the stationary worm wheel.

10 Claims, 3 Drawing Figures

INVENTOR
GEORG TITT
BY Steinberg + Blake
ATTORNEYS 3,696,691

TWO-STAGE WORM GEAR TRANSMISSION

BACKGROUND OF THE INVENTION

The present invention relates to worm gear drives.

In particular, the present invention relates to two-stage worm gear drives where the worm wheel of the first-stage drives the worm of the second-stage so as to achieve a step-down transmission ratio of considerable magnitude.

Also, the present invention relates to worm gear drives where power is transmitted through rolling bodies between the worm and worm wheel of a worm gear.

It is already known to achieve a large stepdown transmission ratio by connecting a pair of worm gear drive stages in series. Conventional transmissions of this type have worms which frictionally engage the worm wheels to rotate the latter. The worm of the first stage generally rotates at a relatively high speed and with a relatively good efficiency. At the worm of the second stage, however, it is not possible to provide the required hydrodynamic lubrication because of the slow speed of rotation. As a result the second stage operates with a poor efficiency, so that the total effeciency of the entire transmission is extremely low.

A further disadvantage encountered with such conventional transmissions resides in the fact that the pair of interconnected worm gear stages are situated in different planes, thus requiring a large amount of space and involving high manufacturing costs, with the total extent of the transmission ratio being smaller than generally desired because of the poor efficiency of these conventional transmissions.

SUMMARY OF THE INVENTION

It is accordingly a primary object of the present invention to provide a two-stage worm gear transmission which will avoid the above drawbacks.

In particular, it is an object of the present invention to provide a two-stage worm gear transmission wherein the components of the first and second stages can all be located in a common plane achieving an exceedingly compact transmission which can be manufactured at relatively low cost.

Furthermore it is an object of the present invention to provide a two-stage transmission where input and output shafts of the transmission are capable of having a common axis.

In addition it is an object of the present invention to provide a two-stage worm gear transmission capable of operating at an efficiency which is far higher than has heretofore been possible and capable of achieving a step-down transmission ratio which is greater than has heretofore been possible.

It is furthermore an object of the present invention to provide a transmission capable of accomplishing the above objects and at the same time being composed of relatively rugged elements which can be quickly and reliably assembled and which can be effectively adjusted so as to bring about a highly effective operation with a long operating life and minimum maintenance.

According to the invention the two-stage worm gear transmission includes a stationary worm wheel having an inner periphery which surrounds the central axis of the worm wheel, and this inner periphery is provided with teeth which are distributed about the latter axis. A rotary frame means has an axis of rotation coinciding with the axis of the stationary worm wheel. At least one first-stage worm gear drive is carried by the rotary frame means and includes a worm and a worm wheel meshing therewith. A second-stage worm gear drive includes the stationary worm wheel and at least one worm which meshes therewith. This latter worm is operatively connected with the worm wheel of the first-stage drive to be driven thereby, and the worm of the second-stage is also carried by the rotary frame means.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
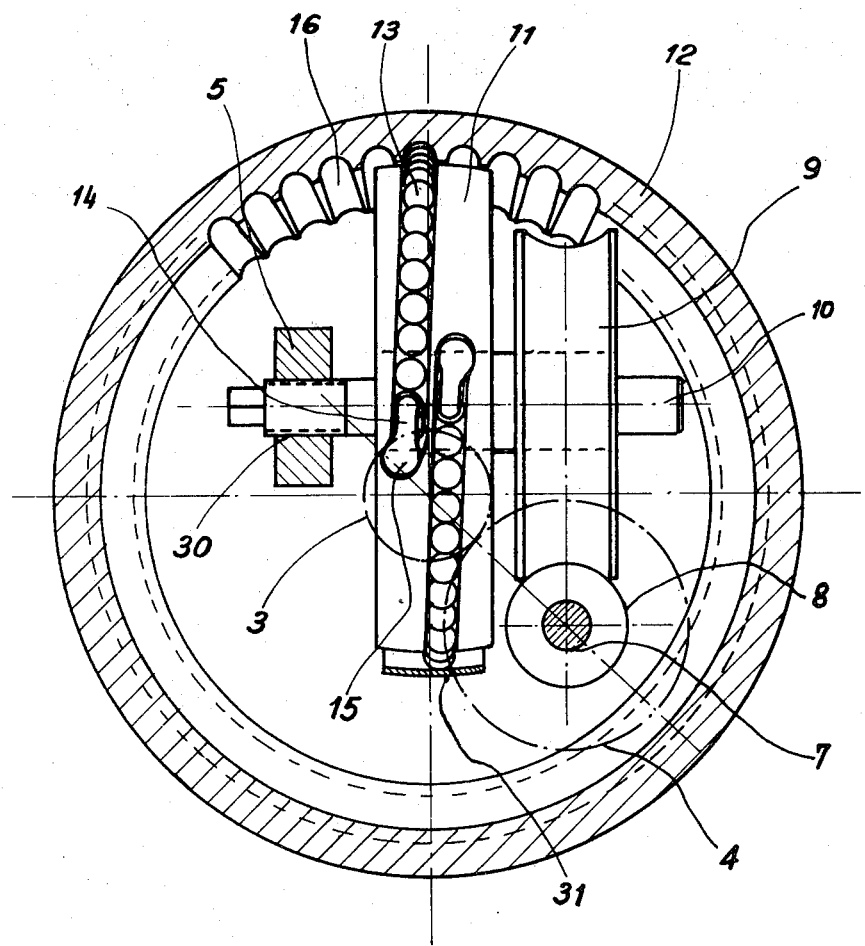
FIG. 1 is a schematic partly sectional elevation of a transmission according to the invention, the plane of FIG. 1 being normal to the central axis of a stationary worm wheel of the transmission.

Referring first to FIG. 1, the two-stage worm gear transmission which is illustrated therein includes a stationary worm wheel 12 in the form of an internal ring gear. This worm wheel 12 surrounds a predetermined central axis which is normal to the plane of FIG. 1. The inner periphery of the worm wheel 12 is provided with teeth 16 which are distributed about this latter predetermined axis of the transmission.

An input means is provided for supplying a drive to the illustrated transmission. This input means includes the schematically illustrated pinion 3 which has an axis of rotation coinciding with the predetermined axis of the stationary worm wheel 12. This pinion 3 drives a gear 4 which is coaxially fixed with a worm 8 of a first-stage worm gear drive. The worm 8 is carried by a shaft 7 which is in turn supported for rotation about its axis by a rotary frame means 5. This rotary frame means 5 is itself supported by a support means described below for rotation about the predetermined central axis of the worm wheel 12. The worm 8 of the first-stage drive meshes with a worm wheel 9 thereof, and in an unillustrated manner, the drive is transmitted between the worm 8 and the worm wheel 9 through rolling bodies.

This worm wheel 9 of the first-stage drive is located directly next to and operatively connected with a worm 11 to drive the latter, the worm 11 and the worm wheel 9 having a common axis of rotation. The worm 11 forms together with the stationary worm wheel 12 the second-stage worm gear drive of the illustrated transmission. The power is transmitted between the worm 11 and worm wheel 12 also through rolling bodies. Thus FIG. 1 schematically illustrates the rolling bodies 13 in the form of balls which are free to roll along a suitable convolution in the form of a groove formed along the exterior of the worm 11. The teeth 16 have a configuration which will form part of the path of travel for the balls 13.

The worm wheel 9 and the worm 11 which are fixed to each other for rotation as a unit are freely turnable on a shaft 10, being prevented from axial movement with respect thereto by any suitable collars or the like. This shaft 10 is carried by the rotary frame means 5.

Figure 3:
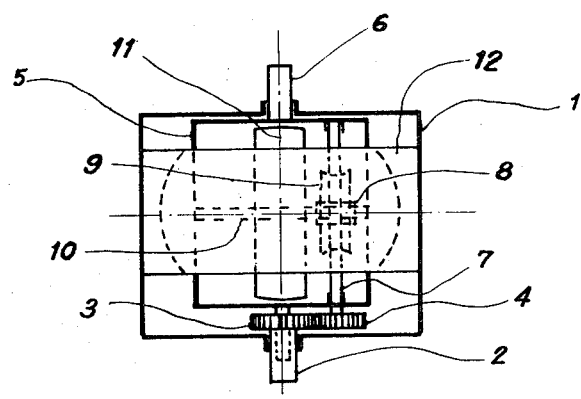
FIG. 3 is a schematic plan view illustrating the general layout of the various components of the embodiment of FIG. 1.

The arrangement of the components of FIG. 1 is illustrated in FIG. 3. Thus, as is schematically represented in FIG. 3, the transmission includes a support means 1 in the form of any suitable housing, for example, which carries the stationary worm wheel 12. The housing 1 and the worm wheel 12 are thus both stationary. The front wall of the housing 1 supports an input shaft 2 for rotary movement, this input shaft 2 forming together with the gears 3 and 4 an input means for transmitting the input to the first-stage worm gear drive 8, 9. Thus FIG. 3 illustrates the input shaft 2, driven from any suitable motor through any transmission such as a belt-and-pulley transmission, for example, fixed with the pinion 3 which in turn meshes with the gear 4 which is coaxially fixed to a rotary shaft 7 which carries the worm 8.

The inner end of the input shaft 2 is formed with an axial bore which receives and supports for free rotary movement a front pin which is fixed to the rotary frame means 5. This rotary frame means 5 extends through the stationary worm wheel 12 and carries all of the components shown within the worm wheel 12 in FIG. 1, so that all of these components rotate together with the frame means 5 about the predetermined central axis of the stationary worm wheel 12. At its rear wall the rotary frame means 5 fixedly carries an output shaft 6 from which the power is taken, this shaft 6 being supported for free rotation by the rear wall of the housing 1 which forms the support means. The output shaft 6 also has an axis coinciding with the predetermined central axis of the stationary worm wheel 12, so that the input shaft 2 and the output shaft 6 have a common axis coinciding with the central axis of the worm wheel 12.

As is most clearly shown in FIG. 1, the shaft 10 which is common to the worm wheel 9 and worm 11 and supports the latter for rotation as a unit has a threaded portion 30 received in a threaded bore of part of the frame means 5, and the left end of the shaft 10 is non-circular so that a suitable wrench can be applied to the shaft 10 for adjusting longitudinally. Through this exceedingly convenient arrangement it is possible to adjust the position of the worm 11 and worm wheel 9 in the transmission.

The stationary worm wheel 12 is fixed in any suitable way in the housing 1 and remains stationary therewith.

The rotary worm wheel 11 of the second-stage worm gear drive carries only a single convolution of rolling bodies 13 and has a diameter which is as large as possible. In other words the diameter of the worm 11 is substantially greater than half the inner diameter of the stationary worm wheel 12 while at the same time the worm 11 is small enough to be surrounded by the worm wheel 12 and readily assembled therewith. As a result of these features highly favorable coaction between the transmission components is achieved. The large diameter of the worm 11 enables the stationary worm wheel 12 to be provided with a substantial axial length so that a relatively long region of engagement is provided between the worm and worm wheel of the second-stage. Also, in this way it is possible to provide for the single convolution of the worm 11 a relatively large number of rolling bodies 13, which in the illustrated example take the form of simple balls. Of course, it is possible also to provide the worm 11 of the second-stage with additional convolutions through a certain range, particularly when using relatively small rolling bodies 13, so as to maintain in this way the largest possible transmission ratio.

The rolling bodies 13 are conveyed between the ends of the single convolution of the worm 11 through a tube 15 capable of receiving the rolling bodies from one end of the convolution and delivering them to the other end of the convolution. This tube 15 is carried by the worm 11 and terminates in a pair of guide or stripper fingers 14 which serve to smoothly guide the balls 13 into the tube 15 from one end of the convolution of worm 11 and out of the tube 15 to the other end of the convolution 11. In this way an endless path of travel is provided for the balls 13 which serve to transmit the power between the worm 11 and the worm wheel 12. In a similar manner rolling bodies are provided to transmit the power between the worm 8 and the worm wheel 9. The frame 5 carries a shell or elongated strip 31 which extends around that part of the worm 11 which is situated beyond the worm wheel 12 and in which this projecting part of the worm 11 freely rotates. This shell 31 closely surrounds and conforms to the configuration of the exterior of the worm 11 in such a way that the rolling bodies 13 can have rolling contact with and be guided by the inner surface of the shell 31 as the rolling bodies travel along the exterior of the worm 11 beyond the worm wheel 12. Thus the shell 31 will maintain the rolling bodies 13 in the spiral groove formed at the exterior of the worm 11 when these rolling bodies 13 travel beyond the worm wheel 12.

Figure 2:
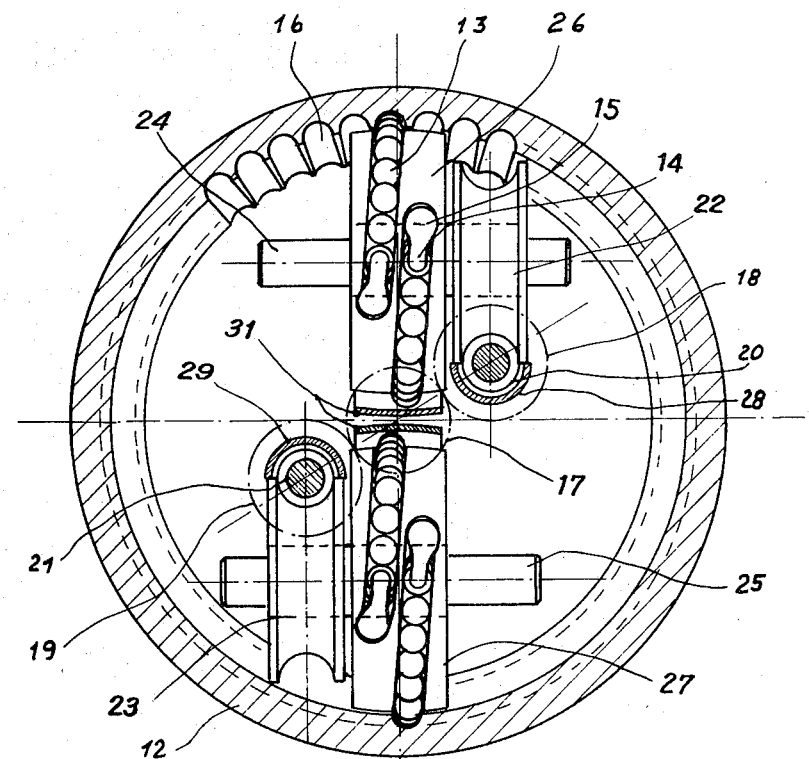
FIG. 2 is a schematic partly sectional elevation showing a second embodiment of the invention, with the plane of FIG. 2 also being normal to the central axis of a stationary worm wheel of the transmission.

According to the embodiment of the invention which is illustrated in FIG. 2, there are a pair of first-stage worm gear drives and the second-stage includes a pair of worms coacting with the single stationary worm wheel 12 of the second-stage. In this embodiment the input shaft is coaxially fixed with a drive pinion 17 which meshes with a pair of gears 18 and 19 which are respectively fixed to a pair of worms 20 and 21 of the pair of first-stage worm gear drives. Power is transmitted from the worms 20 and 21 through suitable rolling bodies, in the form of balls, for example, to the worm wheels 22 and 23, respectively, of the pair of first-stage worm gear drives. These worm wheels 22 and 23 of the two first-stage drives are respectively fixed coaxial with a pair of worms 26 and 27 of the second-stage worm gear drive. These worms of the second-stage drive both mesh with the stationary worm wheel 12 of the second-stage worm gear drive. The coaction in this case also is through rolling bodies 13 which are supported and guided in the manner described above in connection with FIG. 1. Thus, FIG. 2 shows the outer shells or strips 31 carried by the frame 5 and extending along the outer peripheries of the worms 26 and 27 to provide a rolling surface for the balls 13 when they travel beyond the stationary worm wheel 12. Also these balls are conveyed from one to the other of the ends of the single convolution of each worm through a tube 15 provided with the guide fingers 14 as described above. In addition FIG. 2 schematically shows the elongated channel members or shells 28 and 29 which are carried by the frame 5 and which extend around the worms 20 and 21 at the portions thereof which project beyond the worm wheels 22 and 23 so as to form a rolling surface for the rolling bodies of the pair of first-stage worm gear drives, these unillustrated rolling bodies also being guided between the ends of the worm convolutions through a suitable tube while rolling along the inner surfaces of the shells 28 and 29 when the rolling bodies travel beyond the worm wheels at the exterior of the worms of the first-stage drives. A similar construction is of course provided for the first-stage worm gear drive of FIGS. 1 and 3, but it is not illustrated so as to keep the illustrations as clear as possible.

A particular advantage of the embodiment of FIG. 2 resides in the fact that the bearings both at the input and the output are loaded to an extremely small degree because the primary forces are oppositely directed and cancel each other out. Thus the embodiment of FIG. 2 provides an assembly in which the components have a high degree of balance with respect to each other, to achieve additional advantages.

As was the case with FIG. 3, the rotary frame means of FIG. 2 has a front pin received in a bore of the input shaft to be supported thereby for rotation about the axis of the stationary worm wheel 12, and the output shaft of the embodiment of FIG. 2 may be identical with that of FIG. 3.

With both embodiments of the invention a considerable advantage is achieved in that a large amount of space is saved and the compact assembly of the invention provides input and output drives which are coaxial. Moreover, by using rolling body types of power transmissions between the worms and worm wheels each individual worm gear drive can carry out an extremely large reduction, so that the individual transmission ratios can be multiplied into an exceedingly high total step-down transmission ratio, while at the same time maintaining an extremely high efficiency. As is disclosed in greater detail in a copending application of applicant, the worms of the first-stages can take the form of an elastic worm coil curved in part around the worm wheels of the first stages and enabling an exceedingly high reduction ratio to be achieved with small rolling bodies.

Because of the fact that the worm or worms of the second-stage mesh with the inner peripheral teeth of a stationary worm wheel of the second-stage, it is possible to provide for the second-stage worms of exceedingly large diameter. These large worms of the second-stage can coact with the stationary worm wheel through a correspondingly large distance. Moreover, the convolution of the worm or worms of the second-stage has a much lower pitch than can be conventionally provided, with the result that the rolling friction factor of approximately 0.001 to 0.0015 has hardly any influence on the efficiency of operation of the second-stage worm gear drive. For this reason it is possible in accordance with the invention to provide the worm of the second-stage with only a single convolution and with relatively large rolling bodies. Thus exceedingly good meshing relationships are maintained and the stationary worm wheel of the second-stage because of its large axial dimension enables a large number of rolling bodies to carry the load at the second-stage, so that at the relatively low speed of revolution of the frame 5 and of the worm or worms of the second-stage it is still possible to reliably transmit large forces because of the exceedingly large loads which can be effectively absorbed with the structure of the invention.

With the balanced arrangement of FIG. 2 where the pair of first-stage worm gear drives and the worms of the second-stage are arranged equally and oppositely, displaced by 180° with respect to each other, it is possible to achieve greater outputs without increasing the space required by the structure, and the bearing loads at the input and output of the transmission can compensate and equally balance each other.

What is claimed is:

1. In a two-stage worm gear transmission, a stationary worm wheel having a predetermined central axis and having an inner periphery surrounding said axis and formed with teeth distributed about said axis, rotary frame means having an axis of rotation coinciding with said predetermined axis, a first-stage worm gear drive carried by said rotary frame means and including at least one worm and one worm wheel meshing with said one worm, and a second-stage worm gear drive including said stationary worm wheel and at least one worm meshing with said stationary worm wheel and operatively connected with said worm wheel of said first-stage drive to be driven by the latter worm wheel, said worm of said second-stage drive also being carried by said rotary frame means.

2. The combination of claim 1 and wherein each of said stages includes rolling bodies which transmit power between the worm and worm wheel of each stage.

3. The combination of claim 1 and wherein said worm of said second-stage drive has a diameter substantially greater than one half the inner diameter of said stationary worm wheel while still being surrounded by said stationary worm wheel.

4. The combination of claim 2 and wherein the rolling bodies between the worm and worm wheel of said second-stage drive extend only through approximately one convolution along said worm of said second-stage drive.

5. The combination of claim 1 and wherein a pair of first-stage worm gear drives are carried by said rotary frame means and each include a worm and a worm wheel meshing therewith, and said second-stage drive including a pair of worms meshing with said stationary worm wheel and respectively connected operatively to said worm wheels of said pair of first-stage drives to be driven thereby, both of said first-stage drives and both of said worms of said second-stage drive being carried by said rotary frame means.

6. The combination of claim 1 and wherein said worm wheel of said first-stage drive and said worm of said second-stage drive are directly connected together for rotation about a common axis, and a shaft supporting said worm of said second-stage drive and said worm wheel of said first-stage drive for rotation about said common axis, said shaft being carried by said rotary frame means.

7. The combination of claim 6 and wherein an adjusting means is carried by said rotary frame means for longitudinally adjusting said shaft along its axis.

8. The combination of claim 1 and wherein an input drive means is operatively connected with said worm of said first-stage drive for driving said worm, said input drive means including an input shaft having an axis coinciding with said predetermined axis of said stationary worm wheel, and said input shaft being formed with an axial bore, said rotary frame means including a pin turnable in the latter bore for at least partially participating in the support of said rotary frame means for rotation about said predetermined axis, and output means providing an output drive, said output means including a shaft fixed to said rotary frame means for rotation therewith and having an axis coinciding with said predetermined axis.

9. The combination of claim 8 and wherein a support means carries said stationary worm wheel and supports said input and output shafts for rotation about said predetermined axis.

10. The combination of claim 4 and wherein said convolution has opposed ends, a tube in which said rolling bodies travel communicating with said ends for conveying the rolling bodies from one to the other of said ends of said convolution, and a pair of guide fingers situated at opposed ends of said tube and coacting with said rolling bodies for guiding the latter into and out of said tube.

* * * * *